(No Model.)
A. C. & J. K. BOWER.
WEED CUTTER FOR STEAM LAUNCHES.
No. 425,019. Patented Apr. 8, 1890.
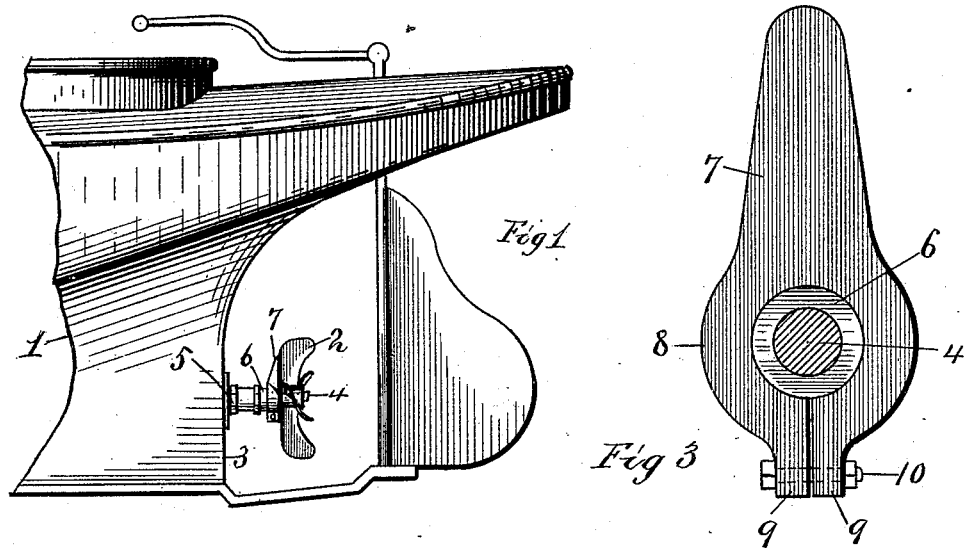
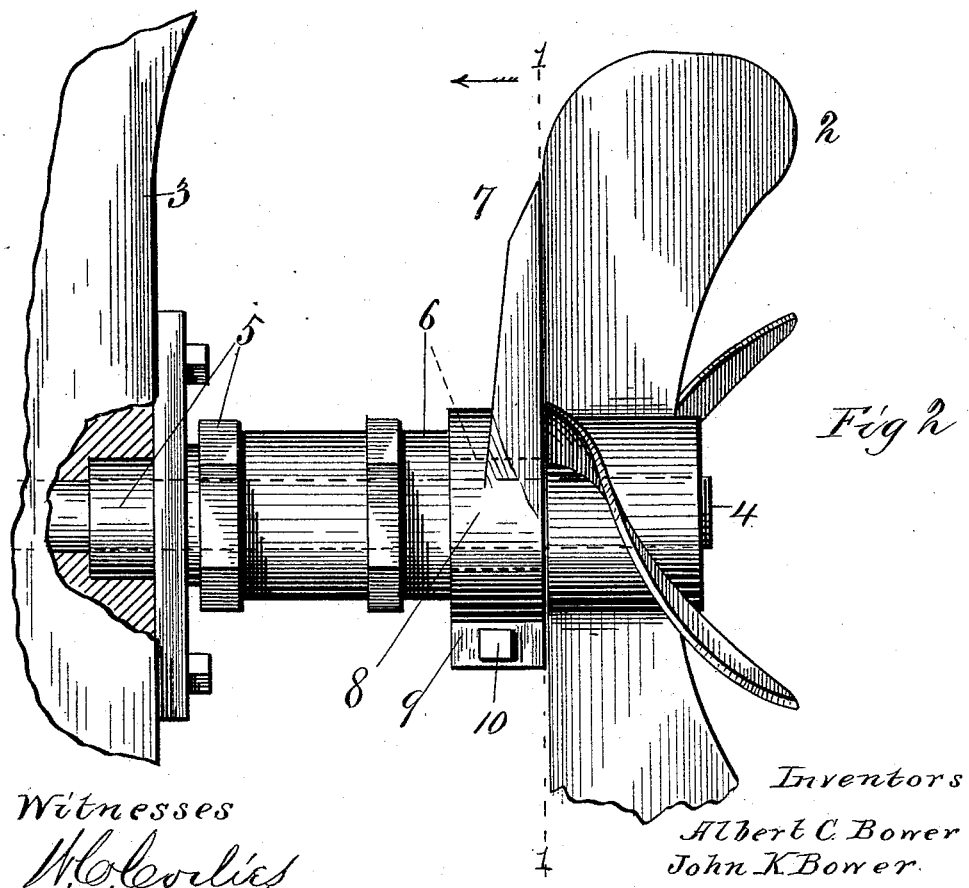
Witnesses
Inventors
Albert C. Bower
John K. Bower
By E. C. Crawford
Atty

UNITED STATES PATENT OFFICE.

ALBERT C. BOWER AND JOHN K. BOWER, OF WAUKEGAN, ILLINOIS.

WEED-CUTTER FOR STEAM-LAUNCHES.

SPECIFICATION forming part of Letters Patent No. 425,019, dated April 8, 1890.

Application filed July 15, 1889. Serial No. 317,505. (No model.)

*To all whom it may concern:*

Be it known that we, ALBERT C. BOWER and JOHN K. BOWER, citizens of the United States, residing at Waukegan, in the county of Lake and State of Illinois, have invented a certain new and useful Weed-Cutter for Steam-Launches, which is fully set forth and described in the following specification, reference being had to the accompanying drawings, in which—

Figure 1 is a side elevation of the stern part of a launch, showing our weed-cutter applied thereto. Fig. 2 is a detail side elevation of the weed-cutter, drawn on an enlarged scale. Fig. 3 is a sectional view of the weed-cutter detached, taken on the line 1 1 of Fig. 2.

Like numerals in the drawings refer to like parts in our invention.

Our invention relates to contrivances for keeping the screw and shaft of a steam-launch free from the weeds and grass that grow and float in lakes and rivers. We accomplish this object by securing a knife-like instrument to the outside stuffing-box or stern-bearing or sleeve covering the shaft of the launch, so that its edges will be in almost immediate contact with the front edge of the screw. The knife is made of fine cast or forged steel or other suitable metal, and its edges are of course made sharp enough to easily cut grass and weeds. The blade need not have a plane face like that shown in the drawings. It may be curved to suit the form of the screw with which it is to be used. It is obvious that as the screw revolves, if it gathers weeds, these will be cut as they are brought in contact with the blade and will thus be prevented from winding about the screw or the shaft.

In the drawings, 1 is a portion of the hull of the launch. 2 is its screw; 3, the stern-post; 4, the shaft; 5, the sleeve upon the latter, and 6 the sleeve part of the stuffing-box. These are all of common construction, needing no explanation.

7 is the knife-blade. It is made integral with the clamp 8. Through the lugs 9 9 of the clamp a hole is made through which passes the screw-threaded bolt 10, fitted with a suitable nut. The clamp is slipped over the stuffing-box or stern-bearing or sleeve on the shaft, so that the knife-blade will be nearly in contact with the screw, and is there secured by tightening the bolt. The knife is then ready for use. Its operation is obvious.

As the screw revolves, it and the knife-blade together act as shears, cutting whatever weeds and grass are brought between them. The grass and weeds being cut drop into the water behind the screw and are carried back in the wake of the launch.

What we claim as new, and desire to secure by Letters Patent of the United States, is—

In a steam-launch, the combination of the stern-bearing, the screw of the launch, a metal clamp designed to be secured on said stern-bearing, and a knife-blade made integral with said clamp, as and for the purpose stated.

ALBERT C. BOWER.
JOHN K. BOWER.

Witnesses:
E. C. CRAWFORD,
FRANK C. LOOMIS.